June 9, 1959 S. DUINKER 2,890,441
MAGNETIC MEMORY DEVICE
Filed Aug. 5, 1955 2 Sheets-Sheet 1
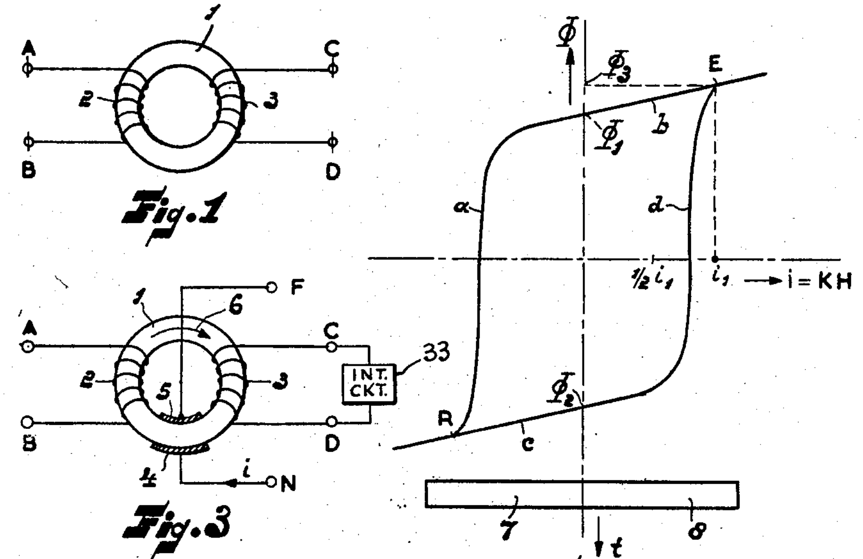
Fig. 1 Fig. 3
Fig. 2
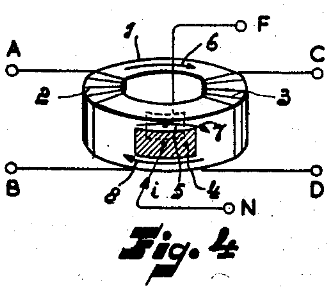
Fig. 4
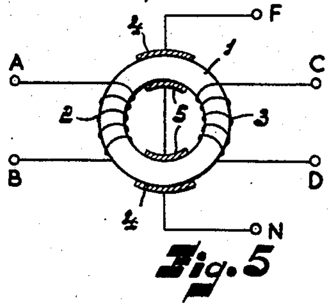
Fig. 5
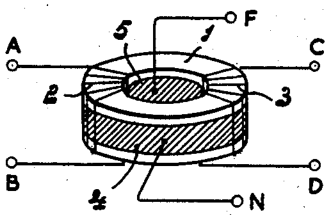
Fig. 6
INVENTOR
SIMON DUINKER
BY Fred M. Vogel
AGENT INVENTOR
SIMON DUINKER
BY Fred M. Vogel
AGENT 2,890,441
Patented June 9, 1959

2,890,441

MAGNETIC MEMORY DEVICE

Simon Duinker, Eindhoven, Netherlands, assignor, by mesne assignments, to North American Philips Company, Inc., New York, N.Y., a corporation of Delaware Application August 5, 1955, Serial No. 526,605

Claims priority, application Netherlands September 4, 1954

10 Claims. (Cl. 340—174)

The invention relates to a memory device comprising a closed, ferromagnetic circuit with a high remanence and an approximately parallelogram-shaped hysteresis loop and comprising at least one input winding and at least one output winding, both windings being coupled with the ferromagnetic circuit.

It is known to use such devices for recording or storing coded information, which is recorded by the residual magnetization or remanence condition of the ferromagnetic circuit. By means of current pulses, which are caused to traverse one or more input windings coupled with the ferromagnetic circuit, a given remanence condition corresponding to "0" or "1" of the coded information may be obtained, for example, "0" may correspond to positive remanence and "1" to negative remanance.

In the known devices the information contained in the ferromagnetic circuit is read by measuring the voltage produced across an output winding coupled with the ferromagnetic circuit under the action of a subsequent current pulse occuring across the said input winding.

However, this reading method has a limitation in that the information contained in the ferromagnetic circuit is lost after having been read, so that, if necessary, it must be recorded again. This, in the first place, requires the use of auxiliary apparatus to hold temporarily the information read and, in the second place, gives rise to loss of time. In order to mitigate this disadvantage it has been suggested to utilize the effect produced by a pulsatory, magnetic field at right angles to the remanent flux of the circuit in a reading winding provided on this circuit. However, this method requires a second ferromagnetic circuit with an air gap, in which the former is arranged partly. Current pulses supplied to a winding of this second circuit produce the said pulsatory magnetic field.

The invention has for its objects to provide a reading method, in which the information contained in the circuit does not get lost and in which magnetic fields at right angles to the remanent flux of the ferromagnetic circuit and the second ferromagnetic circuit are not used. In accordance with the invention the circuit is provided with at least one pair of separated coatings of good electrical conductivity, to which are supplied electrical pulses, which produce, across the circuit, a magnetic field, which is operative in part of the ferromagnetic circuit in the direction of the remanent flux and in a further part of the ferromagnetic circuit in a direction opposite that of the remanent flux.

In order that the invention may be more readily carried into effect, it will now be described more fully with reference to the accompanying drawing, wherein:

Fig. 1 shows a known device,

Fig. 2 shows the hysteresis loop occurring in the core device of Fig. 1;

Fig. 3 is a plan view of an embodiment of a device of the present invention;

Fig. 4 is a perspective view of the embodiment of Fig. 3;

Fig. 5 is a modification of the embodiment of Fig. 3;

Fig. 6 is a further modification of the embodiment of Fig. 3;

Fig. 1 shows a known device for recording coded information.

Figure 7:
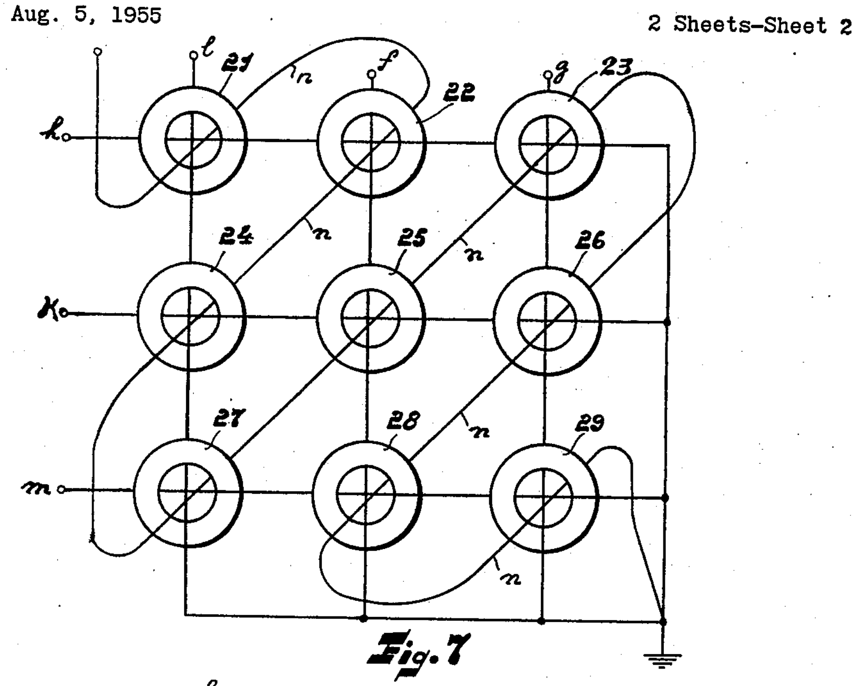
Fig. 7 is a schematic diagram of a memory matrix, in which the information is read in known manner.

Reference numeral 1 designates a ferro-magnetic circuit with a high remanence and a parallelogram-shaped hysteresis loop, numeral 2 designates an input winding having terminals A and B and numeral 3 represents an output winding having terminals C and D. Both the winding 2 and the winding 3 may, if desired, be constituted by one or more conductors taken through the aperture of the circuit 1.

Fig. 2 shows the hysteresis loop of the core 1, in which the flux $\Phi$ is plotted as a function of the current $i$ passing through the winding 2. If $i=0$, there are two remanence conditions, i.e. condition $\Phi_1$ and condition $\Phi_2$. The condition $\Phi_1$ may, for example, correspond to a "0" of the coded information, the condition $\Phi_2$ to a "1." If it is assumed that the circuit is in the condition $\Phi_1$, a positive current pulse supplied to the terminals A and B of a value of $i_1$ will produce flux variations $\Phi_3-\Phi_1$ and $\Phi_1-\Phi_3$ across the core, these variations producing voltages across the terminals C and D of the winding 3. If the circuit is in the condition $\Phi_2$, a positive current pulse supplied to the terminals A and B will produce, during its leading edge, a flux variation $\Phi_3-\Phi_2$ and during its trailing edge a flux variation $\Phi_1-\Phi_3$, which also produce voltages across the terminals C and D of the winding 3, the first voltage peak of which, occurring during the leading edge of the current pulse, is materially larger than the first voltage peak occurring during the condition $\Phi_1$ of the circuit. The difference between "0" and "1" during reading is thus based on the difference between the voltage peaks across the winding 3, this difference being due to the difference in flux variations $\Phi_3-\Phi_1$ and $\Phi_3-\Phi_2$. Whatever the condition of the circuit, after the supply of a current pulse $i_1$ to the terminals A and B, the circuit always assumes the condition $\Phi_1$, which thus corresponds to a "0" of the coded information. The recording of a memory element "1," which means that the circuit is caused to assume the condition $\Phi_2$, is carried out by supplying a negative current pulse, the absolute value of which is at least equal to $i_1$, to the terminals A and B.

Fig. 3 and Fig. 4 are a plan view and a perspective view respectively of one embodiment of a device according to the invention. The corresponding parts of the devices of Figs. 1, 3 and 4 are designated by corresponding reference numerals. Numerals 4 and 5 designate two, separated, spaced coatings of good electrical conductivity, for example, two silver layers, having terminals F and N. It is assumed that the core 1 is in the condition $\Phi_1$ and that the direction of the corresponding remanent flux is the direction indicated by the arrow 6. When a current pulse is supplied to the terminals F and N, the coatings 4 and 5 with the material of the ferro-magnetic circuit between them, said material operating in this case as a dielectric, constitute a capacitor. The pulse supplied to terminals F, N produces, across the magnetic circuit and transverse to the remanent flux 6, a displacement current pulse, which in turn produces a magnetic field. The magnetic field so produced has a direction indicated by the arrows 7 and 8 for the given direction of the current and has, consequently, a direction opposite that of the remanent flux in the upper half of the ferromagnetic circuit and a direction the same as that of the said flux in the lower half of the ferromagnetic circuit.

It is assumed that the ferromagnetic circuit is made from a material of poor electrical conductivity, for example, ferrite, which has furthermore the advantage that its dielectric constant has a considerable value. If this is not the case, the said coatings may be electrically insulated from the circuit, for example, by providing an insulating material between the coatings and the ferromagnetic material. In this case, the coatings and core again act as a capacitor. It is, however, also possible for the ferromagnetic material to act as a resistance. In such case the current pulse also produces a magnetic field as indicated above.

In Fig. 2 these pulsatory, magnetic fields are plotted as a function of the time *t*. It should be noted that in Fig. 2 the *i*-axis is employed, moreover, as an axis on which the magnetic fields H are plotted, since H and *i* are proportional to one another. During the plotting it is, of course, necessary to consider the constant of proportionality, which indicates the relationship between H and *i*.

From Fig. 2 it is evident that the pulse 7, which corresponds to the field operative across the top half of the circuit and designated by the arrow 7 in Fig. 4, produces a flux variation in this part of the core, this variation being given by that part of the hysteresis loop of Fig. 2 which is designated by *a*. Also the pulse 8, which corresponds to the field operating across the bottom half of the circuit and indicated by the arrow 8 of Fig. 4, produces a flux variation in this part of the circuit, this variation being given by that part of the hysteresis loop of Fig. 2 which is designated by *b*.

If only the pulse 7 should be operative, the core would change over from condition $\Phi_1$ to condition $\Phi_2$, as in the device shown in Fig. 1, if this pulse has a sufficient value. It is now found that under the action of the pulse 8 this condition variation of the core 1 is avoided. At the termination of the current pulse across the terminals F and N the core is found to be completely in the initial condition, i.e. the condition $\Phi_1$. Under the action of the pulse 7 the flux in the top half of the ferromagnetic circuit traverses, during the leading edge of the pulse, the curve *a* in the direction $\Phi_1 - R$ and during the trailing edge, just in the opposite direction back to the condition $\Phi_1$, and not to the condition $\Phi_2$, as would occur in the device shown in Fig. 1. The flux in the bottom half of the ferromagnetic circuit traverses, during the leading edge of the pulse 8, the curve *b* in the direction $\Phi_1 - E$ and during the trailing edge in the reversed direction, under the action of this pulse.

However, if the core 1 should be in the condition $\Phi_2$, the pulse 7 would produce a flux variation in the top half of the ferromagnetic circuit, which is given by that part of the hysteresis loop of Fig. 2, which is designated by *c* and the pulse 8 would produce a flux variation in the bottom half of the ferromagnetic circuit, which is given by that part of the hysteresis loop which is designated by *d*. In this case also, the core resumes completely the initial condition at the termination of the current pulse, i.e. the condition $\Phi_2$.

The output winding 3 thus exhibits both the flux variations produced in the bottom half and those produced in the top half of the ferromagnetic circuit and these two variations produce voltages across the winding. If the core is in the condition $\Phi_1$, the flux variations produced in the top half of the ferromagnetic circuit are materially larger than those produced in the bottom half of the ferromagnetic circuit, since curve *a* is materially steeper than curve *b*. The winding 3 is therefore acted upon substantially only by flux variations produced in the top half of the ferromagnetic circuit, which, during the leading edge of the current pulse supplied to the terminals F and N, gives rise to a positive voltage peak, followed by a negative voltage peak during the trailing edge of this current pulse. If the core is, however, in the condition $\Phi_2$, the first-mentioned flux variations are small with respect to the latter variations, since the curve *d* is also materially steeper than the curve *c*. The resultant flux variations which in both cases act upon the winding 3, are however, in the condition $\Phi_1$, opposite those occurring in the condition $\Phi_2$ of the core. Moreover, the voltage peaks occurring at the terminals C and D will have opposite polarities in accordance with the conditions of the core: if the core is in the condition $\Phi_2$, during the leading edge of the current pulse supplied to the terminals F and N a negative voltage peak will occur across the winding 3 and during the trailing edge of this current pulse a positive voltage peak will occur.

The difference between a "0" and a "1" is thus based on the difference in polarity of the voltage peaks across the winding 3. In the first case, during the leading edge of the current pulse supplied to the terminals F and N, first a positive voltage peak occurs and during the trailing edge of this current pulse, a negative voltage peak occurs; in the second case, first a negative voltage peak occurs and then a positive voltage peak. An integrating network 33 connected to the terminals C and D will thus supply, in the first case, a positive voltage pulse and, in the second case, a negative voltage pulse.

It is remarkable that the polarity of the current pulse supplied to the terminals F and N does not affect the output voltages, these voltages depending only upon the direction of the remanent flux (and, of course, upon the sense of winding of the winding 3) since this winding is acted upon to a determinative degree only by flux variations of that half of the ferromagnetic circuit in which the magnetic field produced by the pulsatory current is opposite the direction of the remanent flux. These last mentioned flux variations will thus have always a direction opposite that of the remanent flux, irrespective of the polarity of the current pulses, so that the polarity of the voltage peaks occurring across the winding 3 will vary only with the direction of the remanent flux and not with the polarity of the current pulses, under the action of the current pulses supplied to the terminals F and N. Consequently, if an integrating network is connected to the terminals C and D, a voltage pulse will always occur in accordance with the condition of the core, the polarity thereof not varying with the polarity of the current pulse supplied to the terminals F and N.

Since the polarity of these current pulses does not affect the output voltages of the winding 3, these output voltages may be amplified by providing more than one set of coatings on the core, the capacities thus formed being connected in series with one another arbitrarily.

Fig. 5 shows one embodiment of a core having more than one set of coatings 4 and 5. The parts of the device shown in Fig. 5 are designated by the same reference numerals as those of the preceding figures.

A preferable embodiment, however, is that shown in Fig. 6. The coating 4 embraces the complete outer periphery of the ferromagnetic circuit and the coating 5 embraces the complete inner periphery. Both the magnetic field operating in the direction of the remanent flux and that operating in the opposite direction are now operating throughout the length of the ferromagnetic circuits. This furnishes the maximum voltage across the winding 3 at a given strength of the current pulses supplied to the terminals F and N.

In the foregoing it is assumed that a current pulse is supplied to the terminals F and N. It is simple to prove that, if a voltage pulse is supplied to these terminals in one direction of the remanent flux two positive voltage pulses occur across the output of an integrating network connected to the winding 3 and in the opposite direction of the remanent flux, two negative voltage pulses occur. Also in this case the polarity of the voltage pulses supplied to the terminals F and N does not affect the polarity of the output voltage pulses. It should be noted that it is, of course, not necessary for the ferromagnetic circuit to be made completely from material having a high remanence and an approximately parallelogram-shaped hysteresis loop when carrying out the invention; the invention may also be applied to ferromagnetic circuits constituted by a plurality of parts, of which at least one has a high remanence and an approximately parallelogram-shaped hysteresis loop.

The devices of the invention may be used successfully with so-called memory matrices. Fig. 7 shows such a memory matrix comprising known devices. The cores have a high remanence and parallelogram-shaped hysteresis loop and are arranged in rows and columns. Assuming that all the cores 21 to 29 are in the condition $\Phi_1$, a "1," characterized by the condition $\Phi_2$, is recorded in a given core by supplying a current pulse of $\frac{1}{2}i_1$ (vide Fig. 2) to each of the current conductors connected to the given core. Thus, in the core 28 a "1" is recorded by supplying a pulse to the conductors *f* and *m*. The cores 22, 25, 27 and 29 are then excited by a current pulse of $\frac{1}{2}i_1$. This pulse, however, is just too small to produce a transition from $\Phi_1$ to $\Phi_2$. The reading is effected in the same manner as described with reference to Fig. 2. Only the reading pulse $i_1$ is formed by two current pulses of $\frac{1}{2}i_1$, occurring simultaneously across two conductors. If, for example, the condition of the core 28 is to be determined, pulses of $\frac{1}{2}i_1$ each must be supplied to the conductors *f* and *m*. In accordance with the condition of the core 28, a high or a low voltage peak will occur across the winding *n*. It will be obvious that the information recorded in the various cores cannot be read at the same time and that during reading this information is destroyed.

Figure 8:
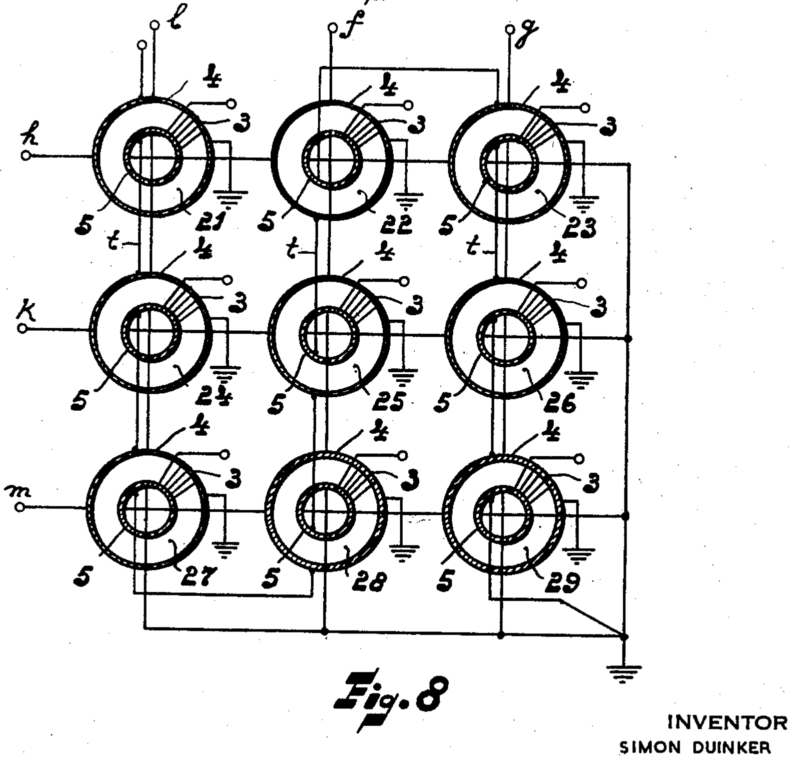
Fig. 8 is a schematic diagram of a memory matrix comprising devices according to the invention.

Fig. 8 shows a memory matrix comprising devices of the invention, i.e. devices of the kind shown in Fig. 6. The information is recorded in a given core in a completely similar manner to that used with the memory matrix shown in Fig. 7. Reading, however, is carried out by supplying a single current pulse to the various coatings 4, 5, which are connected in series by the conductors *t*. A voltage which determines the information of a core concerned is thus produced across each of the windings 3. Thus the complete information of a memory matrix may be available at the same instant, while, moreover, the complete information remains stored in the memory matrix. In other words, non-destructive read-out has been accomplished.

What is claimed is:

1. A magnetic memory device comprising a magnetic storage member constituted of material having a substantially parallelogram-shaped hysteresis characteristic for storing information by the direction of its residual magnetization, input and output windings magnetically coupled to said storage member, and means for sensing said stored information including means comprising conductive connections to said storage member for passing through the material of said storage member a current transverse to the direction of its residual magnetization.

2. A magnetic memory device comprising a closed magnetic circuit including a magnetic storage member constituted of material having a substantially parallelogram-shaped hysteresis characteristic for storing information by the direction of its residual magnetization, input winding means coupled to said magnetic circuit for exciting said storage member to establish therein predetermined residual magnetization, and means for non-destructively reading said stored information; said reading means comprising a pair of spaced, conductive connections of extended surface area to portions of said storage member aligned substantially transverse to the direction of said residual magnetization, and output winding means coupled to said magnetic circuit for deriving an output voltage when a potential is applied across said pair of connections to cause a current flow through said storage member transverse to the direction of its residual magnetization and producing oppositely-directed magnetic fields extending substantially parallel to said residual-magnetization-direction.

3. A device as set forth in claim 2 wherein means are provided for applying a pulsating potential to said pair of connections.

4. A megnetic memory device comprising a closed core including a magnetic storage member constituted of material having a substantially parallelogram-shaped hysteresis characteristic for storing information by the direction of its residual magnetization, input and output windings coupled to said core, and means for sensing said stored information including a pair of spaced, conductive coatings on the inner and outer peripheral portions, respectively, of said closed core and thus aligned transverse to the direction of the residual magnetization of the storage member, and means for applying a potential to the pair of coatings to induce a voltage in the output winding indicative of the direction of said residual magnetization.

5. A device as set forth in claim 4 wherein the conductive coatings extend over the complete inner and outer peripheries of the closed core.

6. A device as set forth in claim 4 wherein an integrating circuit is coupled to said output winding.

7. A magnetic memory device comprising a ferromagnetic core having a portion constituted of a material possessing a substantially parallelogram-shaped hysteresis characteristic and thus possessing the ability to retain information, input means for exciting said core portion into an information-retaining state based upon the direction of its residual magnetization, and means for sensing the informational state of said core portion, said sensing means including a pair of spaced, conductive connections to said core portion to produce in said core portion a pulsed current flowing at right angles to the direction of its residual magnetization and producing oppositely-directed magnetic fields extending substantially parallel to said residual-magnetization-direction, and output means coupled to said core for deriving a voltage indicative of the direction of the residual magnetization but without destroying that residual magnetization.

8. A device as set forth in claim 7 wherein the core portion is constituted of poorly-conductive material, and the sensing current is a displacement current.

9. A device as set forth in claim 7 wherein the core portion is constituted of conductive material, and insulating material is interposed between the core portion and the pair of connections.

10. A magnetic memory matrix comprising a plurality of magnetic circuits each including a core portion constituted of a material possessing a substantially parallelogram-shaped hysteresis characteristic and thus possessing the ability to retain information, means coupled to said circuits for exciting said core portions into an information-retaining state based upon the direction of its residual magnetization, and means for sensing the informational states of said core portions, said sensing means including a pair of spaced, conductive connections to each of said core portions to produce in said core portions a current flowing at right angles to the direction of its residual magnetization, means interconnecting said connections, means for simultaneously applying a pulsing voltage to all of said connection pairs, and output means coupled to each of said magnetic circuits for deriving an output voltage indicative of the informational state of the associated core portion.

References Cited in the file of this patent

UNITED STATES PATENTS 2,734,184 Rajchman -------------- Feb. 7, 1956

OTHER REFERENCES

"A New Nondestructive Read for Magnetic Cores" by R. Thorensen and W. R. Arsenault appearing on pages 111 to 116 of the "1955 Western Joint Computer Conference," published August 1955. Figs. 2, 3 and 5 specifically relied upon.

"A Nondestructive Sensing of Magnetic Cores" by D. A. Buck and W. I. Frank appearing on pp. 822–830 of "Communications and Electronics," published January 1954. Figs. 4 and 7 relied on.